United States Patent
Part et al.

(10) Patent No.: US 10,494,905 B2
(45) Date of Patent: Dec. 3, 2019

(54) DOWNHOLE SENSOR SYSTEM FOR STEAM BREAKTHROUGH DETECTION

(71) Applicant: Oilfield Equipment Development Center Limited, Victoria (SC)

(72) Inventors: Darren Part, St. Albert (CA); Phil Fouillard, Sherwood Park (CA); Daniel Ugricic, Calgary (CA)

(73) Assignee: OILFIELD DEVELOPMENT CENTER LIMITED, Victoria (SC)

( * ) Notice: Subject to any disclaimer, the term of this patent is extended or adjusted under 35 U.S.C. 154(b) by 192 days.

(21) Appl. No.: 15/428,579

(22) Filed: Feb. 9, 2017

(65) Prior Publication Data
US 2017/0234118 A1    Aug. 17, 2017

Related U.S. Application Data

(60) Provisional application No. 62/296,454, filed on Feb. 17, 2016.

(51) Int. Cl.
*E21B 43/24* (2006.01)
*E21B 43/12* (2006.01)
*E21B 47/00* (2012.01)
*G01H 9/00* (2006.01)

(52) U.S. Cl.
CPC ........ *E21B 43/128* (2013.01); *E21B 47/0007* (2013.01); *E21B 43/2406* (2013.01); *G01H 9/004* (2013.01)

(58) Field of Classification Search
CPC ........ E21B 43/12; E21B 43/38; E21B 43/128; E21B 43/2406; E21B 47/0007
See application file for complete search history.

(56) References Cited

U.S. PATENT DOCUMENTS

| | | | |
|---|---|---|---|
| 9,057,256 B2 | 6/2015 | Ige et al. | |
| 2011/0229071 A1* | 9/2011 | Vincelette | E21B 43/2406 385/13 |
| 2012/0018167 A1* | 1/2012 | Konopczynski | E21B 43/14 166/369 |
| 2013/0175030 A1* | 7/2013 | Ige | E21B 43/128 166/250.15 |

OTHER PUBLICATIONS

Canadian Office Action for Application No. 2,957,757; dated May 28, 2018; 4 total pages.
Canadian Office Action for Application No. 2,957,757; dated Jan. 29, 2019; 5 total pages.

* cited by examiner

*Primary Examiner* — David Carroll
(74) *Attorney, Agent, or Firm* — Patterson + Sheridan, LLP

(57) ABSTRACT

An exemplary method of controlling an artificial lift system may include monitoring, via a downhole phase change sensor, for an indication of steam breakthrough, determining the occurrence of a steam breakthrough event based on the indication of steam breakthrough, and adjusting one or more parameters of the artificial lift system based on the determination. One example system for controlling an artificial lift system may include a downhole phase change sensor configured to monitor for an indication of steam breakthrough and a processing system configured to determine the occurrence of a steam breakthrough event based on the indication of steam breakthrough and adjust one or more parameters of the artificial lift system based on the determination.

20 Claims, 4 Drawing Sheets

DOWNHOLE SENSOR SYSTEM FOR STEAM BREAKTHROUGH DETECTION

TECHNICAL FIELD

Certain aspects of the present disclosure generally relate to a downhole phase change sensor system for steam breakthrough detection.

BACKGROUND

Several artificial lift techniques are currently available to initiate and/or increase hydrocarbon production from drilled wells. These artificial lift techniques include rod pumping, plunger lift, gas lift, hydraulic lift, progressing cavity pumping, and electric submersible pumping, for example.

Under certain conditions, such as heavy oil bitumen applications, steam assisted gravity drainage (SAGD) may be employed in hydrocarbon production. SAGD generally employs two wellbores and artificial lift techniques, such as electric submersible pumping (ESP).

Electric submersible pumping systems (ESPs) are widely used throughout the world for recovering subterranean fluids to the earth's surface. ESPs generally employ an electric motor which may be cooled, at least in part, by the fluid pumped around the motor toward the intake of the wellbore.

Sensors are often used to monitor various aspects when operating artificial lift systems. For example, fiber optic sensors may be used to monitor temperatures in a wellbore, motor, or bearing.

SUMMARY

Certain aspects of the present disclosure provide a method for controlling an artificial lift system comprising monitoring, via a downhole phase change sensor, for an indication of steam breakthrough, determining the occurrence of a steam breakthrough event based on the indication of steam breakthrough, and adjusting one or more parameters of the artificial lift system based on the determination.

Certain aspects of the present disclosure provide an apparatus for controlling an artificial lift system comprising a downhole phase change sensor configured to monitor for an indication of steam breakthrough and a processing system configured to determine the occurrence of a steam breakthrough event based on the indication of steam breakthrough and adjust one or more parameters of the artificial lift system based on the determination.

BRIEF DESCRIPTION OF THE DRAWINGS

So that the manner in which the above-recited features of the present disclosure can be understood in detail, a more particular description, briefly summarized above, may be had by reference to certain aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Certain aspects of the disclosure provide techniques and apparatus for a downhole sensory system for steam breakthrough detection in an artificial lift system and controlling the artificial lift system based on the detection of steam breakthrough.

Figure 1:
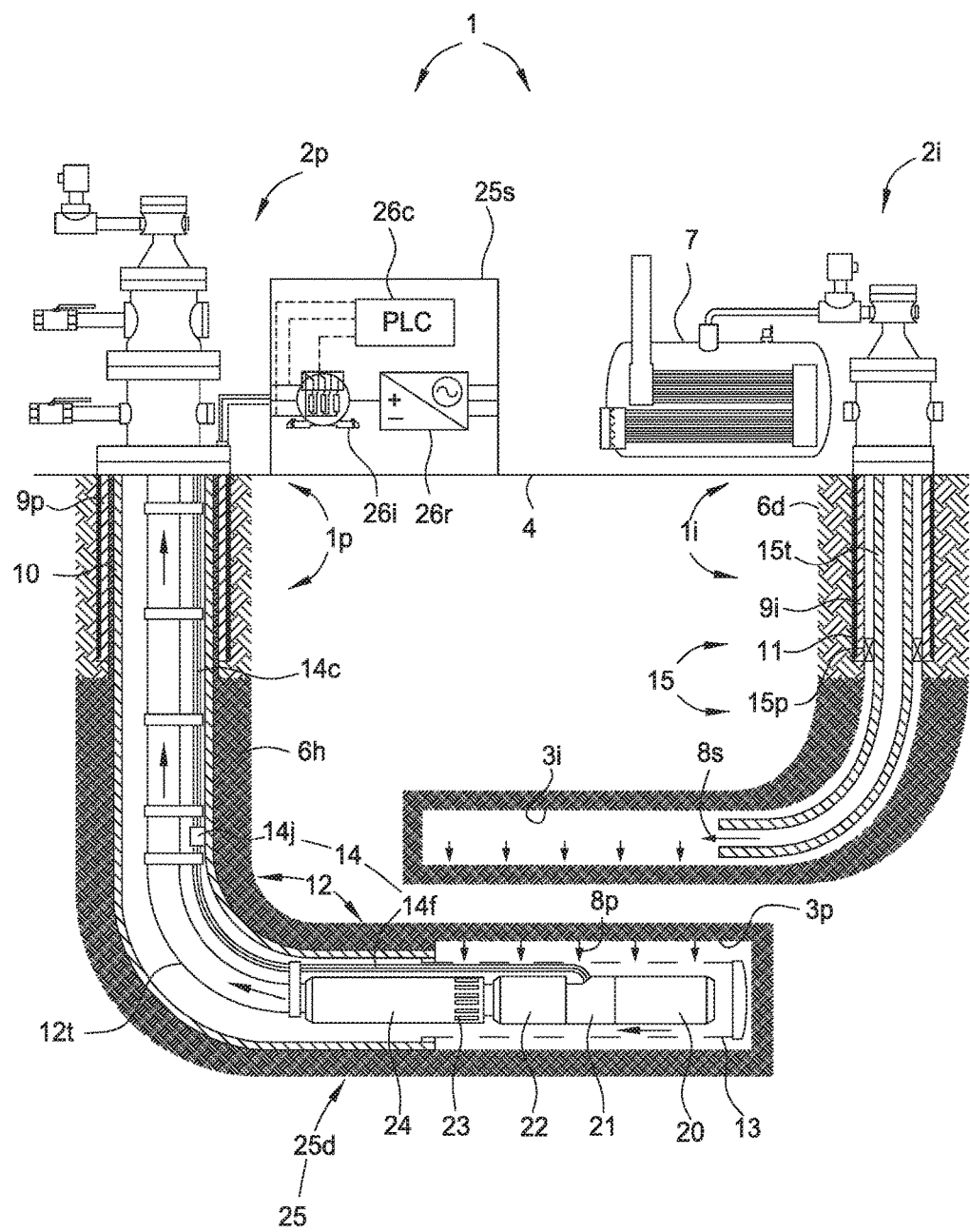
FIG. 1 illustrates an example artificial lift system, according to aspects of the present disclosure.

FIG. 1 illustrates an artificial lift system (ALS) 25 pumping production fluid, such as bitumen 8$p$ (also known as tar sand or oil sand), from a steam assisted gravity drainage (SAGD) well 1, according to one embodiment of the present disclosure. Alternatively, the production fluid may be heavy crude oil or oil shale. The ALS 25 may include a motor driver 25$s$, a power cable 14, and a downhole assembly 25$d$. The SAGD well 1 may include an injection well 1$i$ and a production well 1$p$. Each well 1$i,p$ may include a wellhead 2$i,p$ located adjacent to a surface 4 of the earth and a wellbore 3$i,p$ extending from the respective wellhead. Each wellbore 3$i,p$ may extend from the surface 4 vertically through a non-productive formation 6$d$ and horizontally through a hydrocarbon-bearing formation 6$h$ (aka reservoir). Alternatively, the horizontal portions of either or both wellbores 3$i,p$ may be other deviations besides horizontal. Alternatively, the injection well 1$i$ may be omitted and the ALS 25 may be used to pump production fluid from other types of adverse production wells, such as high temperature wells.

Surface casings 9$i,p$ may extend from respective wellheads 2$i,p$ into respective wellbores 3$i,p$ and each casing may be sealed therein with cement 11. The production well 1$p$ may further include an intermediate casing 10 extending from the production wellhead 2$p$ and into the production wellbore 3$p$ and sealed therein with cement 11. The injection well 1$i$ may further include an injection string 15 having an injection tubing string 15$t$ extending from the injection wellhead 2$i$ and into the injection wellbore 3$i$ and having a packer 15$p$ for sealing an annulus thereof.

A steam generator 7 may be connected to the injection wellhead 2$i$ and may inject steam 8$s$ into the injection wellbore 3$i$ via the injection tubing string 15$t$. The injection wellbore 3$i$ may deliver the steam 8$s$ into the reservoir 6$h$ to heat the bitumen 8$p$ into a flowing condition as the added heat reduces viscosity thereof. The horizontal portion of the production wellbore 3$p$ may be located below the horizontal portion of the injection wellbore 3$i$ to receive the bitumen drainage 8$p$ from the reservoir 6$h$.

A production string 12 may extend from the production wellhead 2$p$ and into the production wellbore 3$p$. The production string 12 may include a string of production tubing 12$t$ and the downhole assembly 25$d$ connected to a bottom of the production tubing. A slotted liner 13 may be hung from a bottom of the intermediate casing 10 and extend into an open hole portion of the production wellbore 3$p$. The downhole assembly 25$d$ may extend into the slotted liner 13. Alternatively, the downhole assembly 25$d$ may extend to a bottom of the intermediate casing 10 or be disposed in the vertical portion of the production wellbore 3$p$.

The downhole assembly 25$d$ may include a submersible electric motor 20, a motor head 21, a motor seal 22, and a pump 24. Housings of the components may be connected and sealed, such as by flanged connections. The flanged connections may longitudinally and torsionally connect the component housings. Shafts of the components may be torsionally connected, such as by shaft couplings. The shaft couplings may be splined couplings. The shaft couplings may also transfer thrust loading from the pump 24 to the motor seal 22.

The pump 24 may be centrifugal, such as a radial flow or mixed axial/radial flow centrifugal pump. The pump 24 may include one or more stages. Each stage may include an impeller and a diffuser. Each impeller may be longitudinally and torsionally connected to the pump shaft and each diffuser may be longitudinally and torsionally connected to the pump housing. Rotation of each impeller by the pump shaft may impart velocity to the bitumen 8p and flow through the stationary diffuser, which may convert a portion of the velocity into pressure. The pump 24 may deliver the bitumen 8p to the production tubing 12t via a discharge head. Alternatively, the pump 24 may be a positive displacement pump, such as a gear pump, vane pump, or progressive cavity pump.

An inlet 23 of the pump 24 may include a plurality of ports formed through the pump housing for allowing bitumen 8p to enter a lower or first stage of the pump and a screen to filter particulates from the production fluid. Alternatively, the inlet 23 may be a separate component, such as a bottom feeder having a housing and ported mandrel rotatable relative thereto and eccentrically weighted such that the mandrel ports orient in response to gravity to face a bottom side of the horizontal portion of the production wellbore 3p. Alternatively, the inlet 23 may be a separate component, such as a static gas separator or rotary gas separator depending on the gas content of the bitumen 8p.

The motor 20 may be an induction motor or a permanent magnet motor, such as a brushless DC motor (BLDC). The motor 20 may be filled with a dielectric, thermally conductive liquid lubricant, such as motor oil 48 (FIGS. 3A and 3B). The motor oil 48 may have a density less than the bitumen 8p. In operation, the motor 20 may rotate the motor shaft, thereby driving the pump shaft. The induction motor may be a two-pole, three-phase, squirrel-cage type and have a wound stator. The BLDC motor may be two pole and three phase. The BLDC motor may include a stator having the three phase winding and a permanent magnet rotor. The permanent magnet rotor may be made of one or more rare earth, ceramic, or ceramic-metal composite (aka cermet) magnets.

The motor driver 25s may provide power and control to the motor 20. A surface cable may connect from the motor driver 25s to the production wellhead 2p. The surface cable may connect to a penetrator at the wellhead 2p. The penetrator may connect the surface cable to a downhole cable 14c. The downhole cable 14c may extend down a length of the production tubing 12t and may be fastened to the production tubing 12t at various intervals. The downhole cable 14c may terminate at a splice 14j. The splice 14j may connect the downhole cable 14c to a motor lead extension (MLE) cable 14f. The MLE cable 14f may be flat to fit in an annulus formed between the pump 24 and the casing 10 and/or liner 13. The MLE cable 14f may terminate at a pothead of the motor head 21. The pothead may connect the MLE cable 14f to internal leads (not shown) connected to stator windings of the motor 20. Each cable 14c,f may include a conductor for each phase of the motor (i.e., three), an insulating jacket for each conductor, a fluid barrier, a buffer, and armor.

Alternatively, the downhole assembly 25d may include a second (or more) motor stacked in tandem with the motor 20 and/or the motor 20 may include one (or more) additional stages.

The motor driver 25s may include a rectifier 26r, an inverter 26i, a programmable logic controller (PLC) 26c, and one or more sensors (not shown), such as a voltmeter and one or more ammeters. The motor driver 25s may receive a three phase alternating current (AC) power signal from a utility grid or generator (not shown). The rectifier 26r may convert the three phase AC power signal to a direct current (DC) power signal and supply the converted DC power signal to the inverter 26i. For the induction motor, the inverter 26i may output a three phase sinusoidal power signal at a variable frequency to control the speed of the motor 20.

For the BLDC motor, the inverter 26i may have an output for each phase (i.e., three) of the motor 20 and may modulate the DC power signal to drive each phase of the stator 10s based on control signals from the PLC 26c. The sensors may measure voltage and current of one or more of the inverter outputs and be in data communication with the PLC 26c. For the BLDC motor, the PLC 26c may execute a program for commissioning the motor 20 to obtain necessary parameters for model-based back electromotive force (BEMF) control of the motor. The PLC 26c may utilize data from the commissioning program to execute a BEMF model of the motor 20 for estimating a position of the rotor. The PLC 26c may use the estimated rotor position to control the inverter 26i such that the frequency of the power signals supplied to the stator windings match the frequency of the rotation of the magnetic field in the rotor. The PLC 26c may iteratively repeat the estimating and control in real time.

Alternatively, the motor driver 25s and the motor head 21 may each include a transformer (not shown). The motor driver transformer may increase voltage of the modulated power signals for transport along the cables 14c,f and the motor head transformer may reduce the voltage for delivery to the stator 10s.

Alternatively, a production packer (not shown) may be set between the production tubing 12t or downhole assembly 25d and the intermediate casing 10.

SAGD systems may be used to produce heavy hydrocarbons such as those associated with oil sands or other heavy crude production. In SAGD systems, two or more parallel wells may be drilled. These parallel wells may be drilled into a formation horizontally such that one well is positioned above the other. Steam may be injected via the upper well into the formation. This steam may form a steam chamber within the formation and the heat from the steam reduces the viscosity of the hydrocarbons within the formation. In addition, as the oil formation is heated, differential thermal expansion from composition variations in formation may result in fractures, allowing hydrocarbons to flow. Gravity drainage allows the hydrocarbons to flow downward towards the lower, production well. The density of the hydrocarbons, as compared to the steam may allow the steam to fill void spaces produced as the hydrocarbons redistributes. Hydrocarbons draining into the production well may be recovered to the surface via artificial lift systems, such as an electric submersible pump (ESP).

Applications for artificial lift systems, such as ESP, in SAGD systems generally operate under challenging conditions. For example, SAGD systems may be used to produce highly viscous heavy or extra heavy crude oil and bitumen mixed with sand, clay and/or water. This fluid mixture may be heated to very high temperatures, for example over 200° C., from the injected steam to reduce the viscosity of the fluid mixture to a pumpable level. The ESP may operate to pump this fluid mixture towards the surface and thus the ESP may operate under very high temperatures in the presence of potentially abrasive sand and a high level of water vapor. Of the conditions under which the ESP may operate, the high temperatures may be the most challenging.

The ESP may utilize the fluid mixture, at least in part, to maintain temperatures within operating limits. More specifically, the heat produced by the electric motor 20 may be dissipated by the velocity of the fluid mixture as it flows by the motor 20 and seal 22 toward the intake 23, keeping the motor 20 within operating temperature limits and operating satisfactorily.

This cooling effect from the fluid mixture is based in part on the specific heat capacities of water and oil in the fluid mixture to carry away the heat from the motor. However, steam has a relatively low specific heat capacity as compared to water and oil and may be unable to adequately cool the motor or seal. This reduction in cooling capacity may risk breakdown of the motor insulation and lead to a downhole short in the motor.

Figure 2:
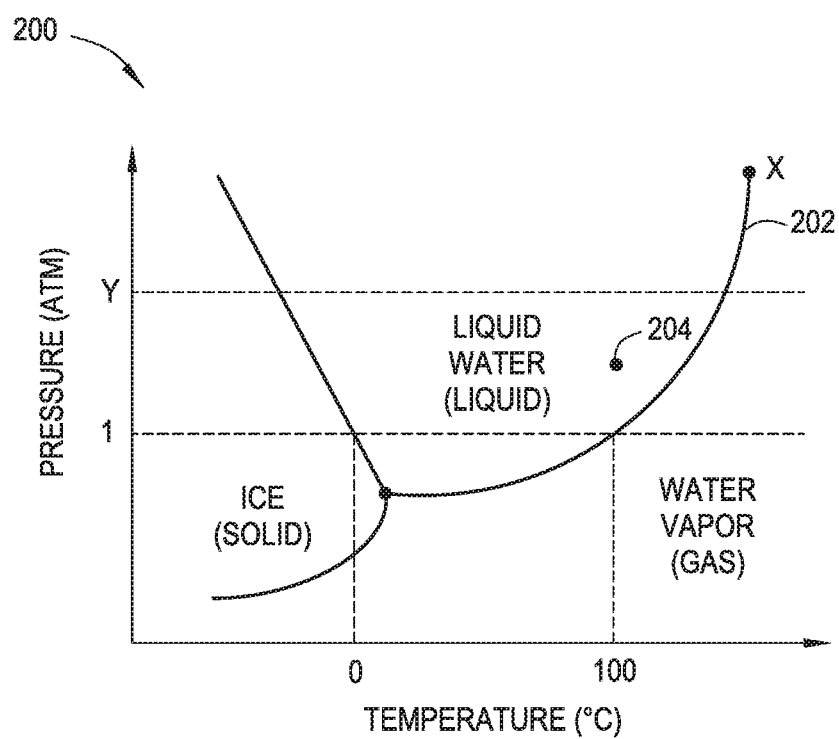
FIG. 2 illustrates a phase change diagram 200 for water.

Steam may breakthrough in some cases, by operating outside of a phase envelope. FIG. 2 illustrates a phase change diagram 200 for water. Phase line 202 indicates the boundary between stable phases, here liquid and gas, as a function of temperature and pressure. For example, at temperature and pressure conditions 204, water may be present in a liquid phase. Increasing the temperature or decreasing the pressure results in the liquid water boiling into steam.

Figure 3:
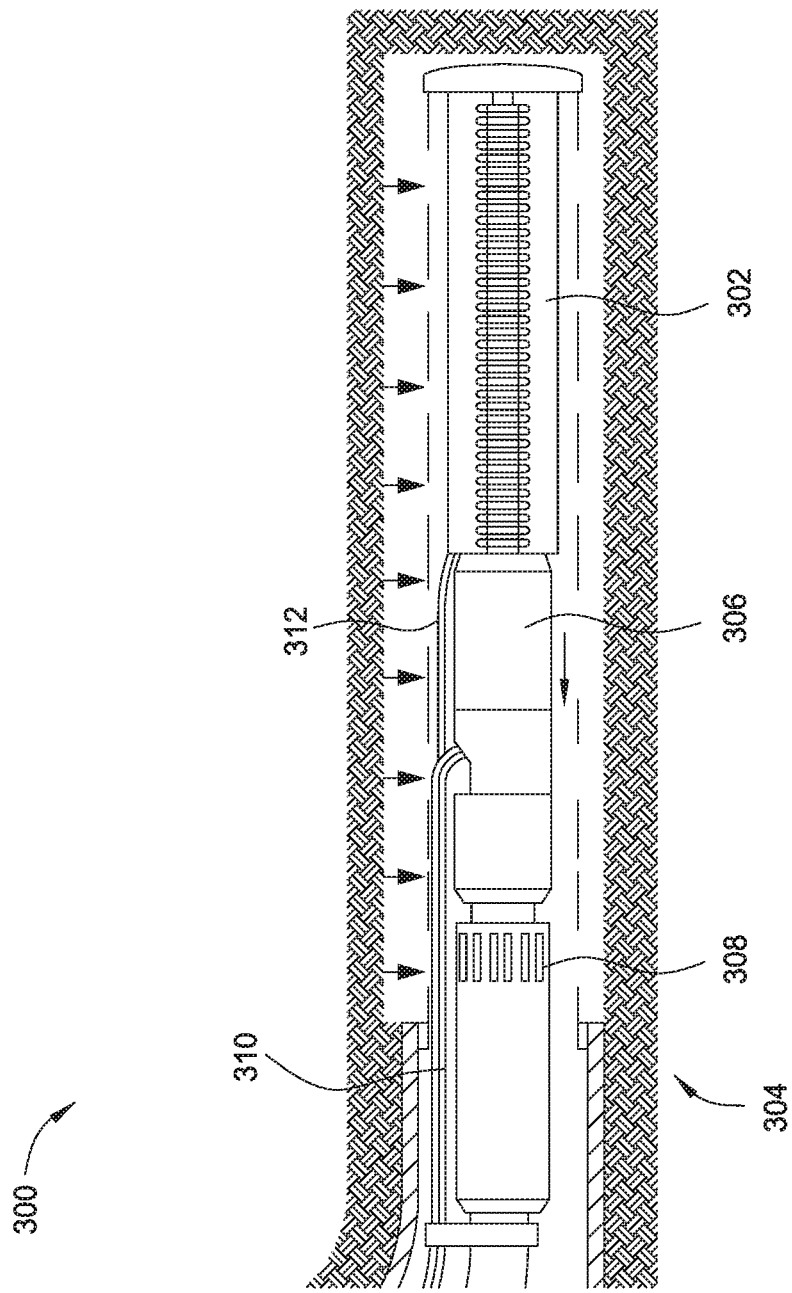
FIG. 3 illustrates an example downhole sensor system for steam breakthrough detection, according to aspects of the present disclosure.

FIG. 3 illustrates an example downhole sensor system 300 for steam breakthrough detection, according to aspects of the present disclosure. To help detect the onset of steam breakthrough, a phase change sensor 302 may be positioned downhole, for example on a downhole assembly 304. In one example, the phase change sensor 302 may be coupled to a motor 306. According to aspects of the present disclosure, the phase change sensor 302 may be positioned downstream (shown as below) from a pump intake 308 to facilitate detection of steam breakthrough prior to steam reaching the intake in substantial amounts.

According to aspects of the present disclosure, the phase change sensor 302 may be a fiber optic sensor. The fiber optic sensor may be configured to detect acoustic frequencies generated in the mixture as gas bubbles are forming. For example, as a fluid approaches boiling point, gasses dissolved in the fluid may coalesce into gas bubbles, for example, near a heating site or at surface irregularities. These gas bubbles may travel, for example, towards the pump intake. Local variations in temperature or pressure may cause these bubbles to collapse. The acoustic frequencies of the collapsing bubbles may also be detected. According to aspects of the present disclosure, the phase change sensor may gather acoustic information indicating steam breakthrough. This indication may be associated with the acoustic signature of bubble formation or collapse prior to fluid boiling.

According to aspects of the present disclosure, output from the phase change sensor 302 may be transmitted via a control cable, to the surface. For example, the phase change sensor 302 may be linked to the surface via an optical fiber cable 312 coupled to the phase change sensor 302. The output from the phase change sensor 302 may be input to a readout panel (not shown) on the surface. The readout panel may include a processing system configured to process the acoustic information gathered by the phase change sensor and detect the acoustic signature associated with bubble formation or collapse prior to or at the onset of steam breakthrough.

The processing system of the control panel may be coupled to a motor controller, for example, the PLC 26c in FIG. 1, and indicate, to the motor controller, adjustments to one or more parameters such as the operating speed of the pump. Adjustments made to the operating speed may change the amount of downhole pressure. For example, if the processing system detects a signal indicating impending or onset of steam breakthrough, the processing system may reduce the operating speed of the pump, thereby increasing the downhole pressure to prevent or stop steam breakthrough. As another example, if the processing system does not detect a signal indicating impending or onset of steam breakthrough, the processing system may increase the operating speed of the pump, thereby decreasing downhole pressure. This adjustment in operating speed may be based on predetermined amounts. According to certain aspects, the pre-determined amounts of adjustment may be selected based on the acoustic signature detected, for example, by matching the detected signature to one or more known signatures. In yet another embodiment, in response to the detected signals, the processing system may shut down the pump.

Figure 4:
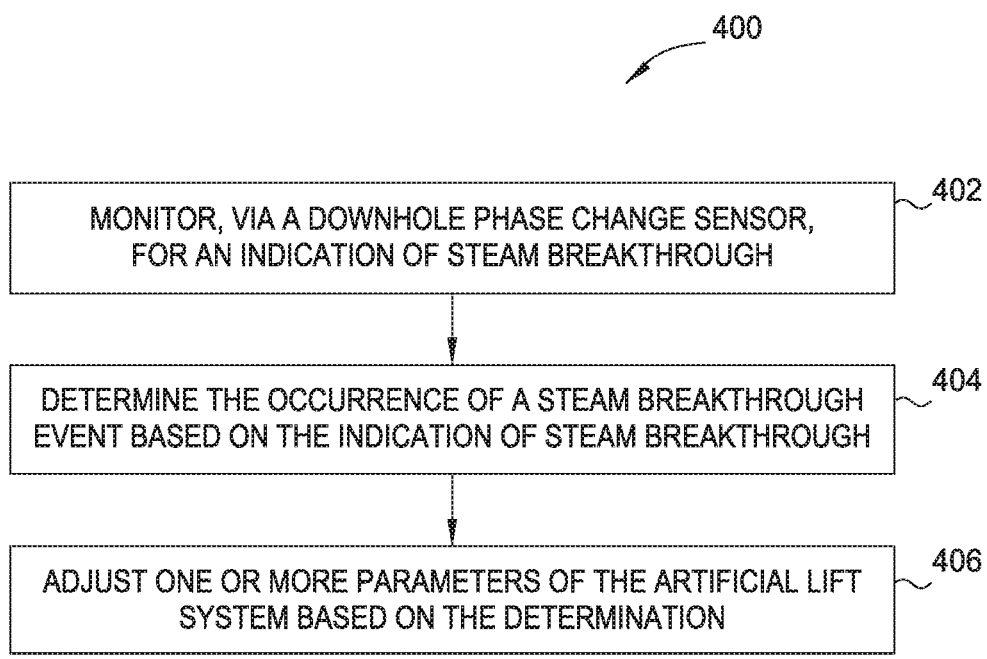
FIG. 4 is a flow diagram of example operations for controlling an artificial lift system, according to aspects of the present disclosure.

FIG. 4 is a flow diagram of example operations 400 for controlling an artificial lift system, according to aspects of the present disclosure. The operations may start at 402 by monitoring, via a downhole phase change sensor, for an indication of steam breakthrough. At 404, determining the occurrence of a steam breakthrough event based on the indication of steam breakthrough. At 406, adjusting one or more parameters of the artificial lift system based on the determination.

Any of the operations described above, such as the operations 400, may be included as instructions in a computer-readable medium for execution by any suitable processing system. The computer-readable medium may comprise any suitable memory or other storage device for storing instructions, such as read-only memory (ROM), random access memory (RAM), flash memory, an electrically erasable programmable ROM (EEPROM), a compact disc ROM (CD-ROM), or a floppy disk.

While the foregoing is directed to certain aspects of the present disclosure, other and further aspects may be devised without departing from the basic scope thereof, and the scope thereof is determined by the claims that follow.

The invention claimed is:

1. A method for controlling an artificial lift system, comprising:
   monitoring, via a downhole phase change sensor, for an indication of steam breakthrough;
   determining an occurrence of a steam breakthrough event based on the indication of steam breakthrough by detecting an acoustic signature of gas bubble formation or collapse prior to fluid boiling; and
   adjusting one or more parameters of the artificial lift system based on the determination.

2. The method of claim 1, wherein the downhole phase change sensor comprises a fiber optic acoustic sensor.

3. The method of claim 1, wherein the artificial lift system comprises an electric submersible pump.

4. The method of claim 3, wherein the one or more parameters comprise at least one of raising or lower an operating speed of the electric submersible pump.

5. The method of claim 1, wherein the indication of steam breakthrough comprises at least one of steam formation or onset of steam formation.

6. The method of claim 1, wherein the downhole phase change sensor is positioned downstream of a fluid intake.

7. The method of claim 1, wherein the determining comprises processing a signal from the downhole phase change sensor for the indication of steam breakthrough.

8. The method of claim 7, wherein the processing is performed at a surface.

9. The method of claim 7, wherein the processing is based on a comparison with predefined indications of steam breakthrough.

10. The method of claim 1, wherein the downhole phase change sensor is positioned to facilitate detection of steam breakthrough prior to steam reaching an intake of the artificial lift system.

11. An apparatus for controlling an artificial lift system, comprising:
   a downhole phase change sensor configured to monitor for an indication of steam breakthrough by detecting an acoustic signature of gas bubble formation or collapse prior to fluid boiling;
   a processing system configured to:
      determine an occurrence of a steam breakthrough event based on the indication of steam breakthrough; and
      adjust one or more parameters of the artificial lift system based on the determination.

12. The apparatus of claim 11, wherein the downhole phase change sensor comprises an optical acoustic sensor.

13. The apparatus of claim 11, wherein the artificial lift system comprises an electric submersible pump.

14. The apparatus of claim 13, wherein the one or more parameters comprises at least one of raising or lower an operating speed of the electric submersible pump.

15. The apparatus of claim 11, wherein the indication of steam breakthrough comprises at least one of steam formation or onset of steam formation.

16. The apparatus of claim 11, wherein the downhole phase change sensor is positioned downstream of a fluid intake.

17. The apparatus of claim 11, wherein the determining comprises processing a signal from the downhole phase change sensor for the indication of steam breakthrough.

18. The apparatus of claim 17, wherein the processing is performed at a surface.

19. The apparatus of claim 17, wherein the processing is based on a comparison with predefined indications of steam breakthrough.

20. The apparatus of claim 11, wherein the downhole phase change sensor is positioned to facilitate detection of steam breakthrough prior to steam reaching an intake of the artificial lift system.

* * * * *